Nov. 2, 1926.
L. J. LEON
BIRDCAGE
Filed June 23, 1924
1,605,247
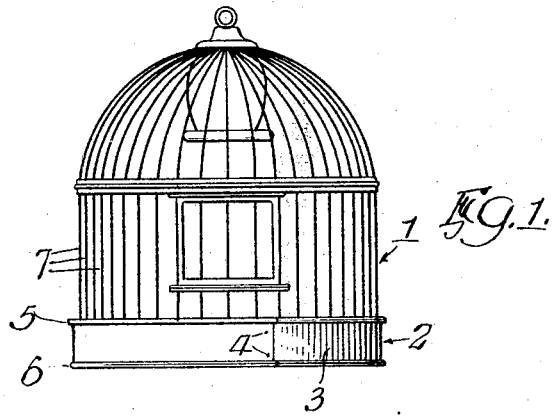
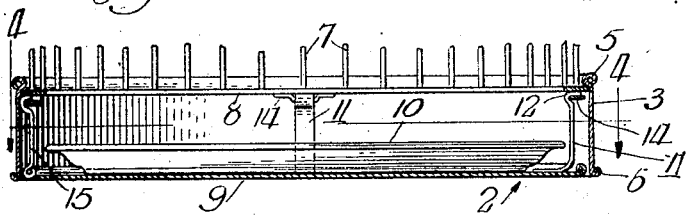
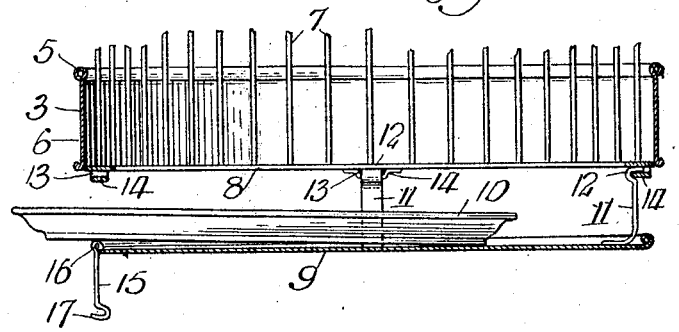
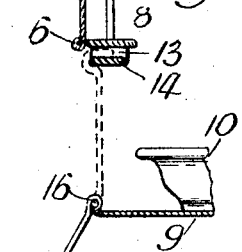
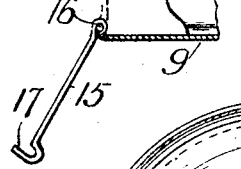
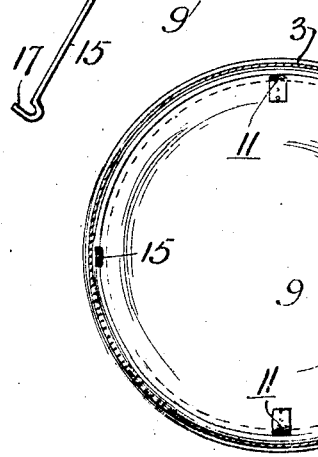
Inventor
L. J. Leon Patented Nov. 2, 1926.

1,605,247

UNITED STATES PATENT OFFICE.

LEWICKI J. LEON, OF CHICAGO, ILLINOIS.

BIRDCAGE.

Application filed June 23, 1924. Serial No. 721,677.

This invention relates to bird cages.

The main object of my invention is to suspend the bottom wall of the base from the lower end of the cage body to provide a space for the tray and have the marginal surrounding wall of the base slidably mounted so that it may be raised up on the cage body to permit access into the base for the removal and insertion of the tray without separating the cage body and base.

The invention consists further in the matters hereinafter described and more particularly set forth in the appended claims.

In the accompanying drawings—

Fig. 1 is a side view of a bird cage embodying the features of my invention;

Fig. 2 is a vertical sectional view of the base of the cage with the marginal wall in closed position;

Fig. 3 is a similar view showing the marginal wall raised to open the base for withdrawal or insertion of a tray;

Fig. 4 is a horizontal sectional view taken on line 4—4 of Fig. 2;

Fig. 5 is an enlarged detail view of the hinged or pivoted hook member carried by the bottom wall of the base; and Fig. 6 is a detail of construction to be presently described.

As illustrated in Fig. 1, the cage comprises a body part 1 and a base 2, both circular in form and with the top of the cage body 1 dome shape, as shown.

The base 1 has an upright marginal wall 3 made in the form of an annular band from a single strip of material, such as sheet brass or other sheet metal, depending on the kind used. After being bent into annular form, when the base is circular, the band 3 has its meeting ends secured together in any suitable manner, as by rivets 4, as shown in Fig. 1. The marginal wall 3 being in band form and of one piece of material makes it open clear through, and its upper and lower edges may be provided with beads 5, 6 for ornamental as well as strengthening purposes.

The cage body consists of spaced wires 7, 7 secured to a ring member 8 around its lower edge, as shown in Fig. 2. The diameter of the marginal wall 3 is greater than that of the ring 8 so that the wall 3 may slide up and down with respect to the ring. The upper bead 5 is formed in such a manner that it rests on the ring 8 to support the wall 3 in closed position, as shown in Figs. 1 and 2.

The base 2 has a bottom wall 9 fitting within the wall 3. The bottom wall 9 is suspended from the ring 8 to provide a space in the base 2 for a tray 10 when used. One form of suspending the wall 9 from the ring 8 is shown in the drawings and comprises a plurality of arms 11, 11, preferably three in number and spaced quarter distances apart about the bottom wall. These arms 11 are preferably made of resilient material and are fixed to the bottom wall adjacent its outer margin. The arms extend upward from the bottom wall and have their upper ends made hook shape, as at 12, to enter slots 13 formed by keeper plates 14 carried by the ring 8. These plates 14 are preferably secured to the under side of the ring and the hooks 12 face outward so as to engage the plates 14 from the inside and thus not interfere with the sliding movement of the wall 3 on opening the base for removal or insertion of the tray 10.

To have half of the circumference of the base opened for the tray 10 to pass through after the wall 3 has been raised into position shown in Fig. 3 and yet connect the bottom wall 9 with the ring 8 at a point midway of the opening when the wall 3 is in closed position, as shown in Fig. 2, I provide a connecting member 15 pivoted at one end, as at 16, to the marginal part of the bottom wall 9. The other end of the member 15 is made hook shape, as at 17. The hook 17 is arranged to enter the slot 13 in the keeper 14 on the ring 8 at the place of the hook, as shown in Figs. 2 and 5. The hook when closed, as shown in Fig. 2 is out of the path of sliding movement of the wall 3, and when the latter is raised the hook 17 may be reached from the outside of the cage and swung down in the position shown in full lines in Figs. 5 and 3, thereupon widening the opening for the removal of the tray 10 without disconnecting the attached members 11, 11 from the ring 8. The tray after being cleaned, if that is the purpose for its removal, is inserted back into the base 2 in the bottom wall 9 while the hook 17 is in its lowered position. The hook member 15 is then swung up to engage its keeper 14 and the wall 3 is then lowered to close the base between the ring 8 and the bottom wall 9.

The structure shown and described has a number of advantages, among which are the following. The base 2 is made of two main parts and these being separate facilitates their manufacture. The wall 3 may be made from strips of material rolled to shape, thus avoiding the expense and labor of spinning or otherwise forming. The tray 10 may be removed from the base 2 and be placed back in the same without separating the base from the cage body, thus limiting the opening required to the minimum and preventing the escape of the bird in the cage. The opening afforded for the tray 10 on swinging the member 15 into open position is sufficient to allow the tray to slide through without weakening the connection of the bottom wall 9 with the cage body. The hook members 11 and 15 located inside the wall 3 are housed and concealed thereby when the wall is closed, thus hiding from view all fasteners. This adds to the appearance of the cage. Moreover, the members 11, 15 do not project outside the cage to catch on surrounding objects or strike against other cages to mar or scratch them during handling in packing and shipping. The structure of my invention enables making the base 2, either in whole or in part, of celluloid, pyroxylin, or other like relatively light, non-metallic material to reduce the cost of manufacture as well as provide a base which may be readily and easily cleaned and kept sanitary. Moreover, this material is supplied commercially in varied colors, thus allowing the bases to be made in different tones to harmonize with the color scheme of the cage bodies, which may also be made of the same material.

While I have shown and described herein in detail a bird cage structure embodying the features of my invention, it is of course to be understood that the shape of the cage, details of construction and arrangement of parts may be variously changed and modified without departing from the spirit and scope of my invention.

I claim as my invention:

1. A bird cage, comprising a cage body and base, said base having a marginal wall and a bottom wall, the latter being spaced below the cage body and carried thereby, said marginal wall being movable on the cage body for opening and closing the space between the bottom wall and the cage body.

2. A bird cage, comprising a cage body and base, said cage body having a member extending around its lower end, said base having a marginal wall and a bottom wall, the latter being directly carried by said cage body and spaced below said member, said marginal wall being slidably carried by said cage body and having a surrounding bead above said member for holding said marginal wall from dropping off the cage body when lowered and closing the space between said member and bottom wall, said marginal wall when raised above the bottom wall opening said space.

3. A bird cage, comprising a cage body and base, said cage body having a member extending around its lower end, said base having a marginal wall and a bottom wall, the latter being spaced below said member, a plurality of spaced arms extending between and connecting the bottom wall to said member, said marginal wall being movably carried by said cage body for opening and closing the space between said member and bottom wall.

4. A bird cage, comprising a cage body and base, said cage body having a member extending around its lower end, said base having a marginal wall and a bottom wall, the latter being spaced below said member, a plurality of spaced arms extending between and connecting the bottom wall to said member, said arms being carried by one of the parts between which they extend and having releasable connection with the other part so that said bottom wall may be removed from the cage body, said marginal wall being movably carried by said cage body for opening and closing the space between said member and bottom wall.

5. A bird cage, comprising a cage body and base, said cage body having a member extending around its lower end, said base having a marginal wall and a bottom wall, the latter being spaced below said member, a plurality of spaced arms extending between and connecting the bottom wall to said member, said arms being carried by one of the parts between which they extend and having releasable connection with the other part so that said bottom wall may be removed from the cage body, one of said arms being hinged to the part by which it is carried.

6. A bird cage, comprising a cage body and base, said cage body having a member extending around its lower end, said base having a marginal wall and a bottom wall, the latter being spaced below said member, a plurality of spaced arms extending between and connecting the bottom wall to said member, said arms being carried by said bottom wall and having releasable connection with keepers on the under side of said member for disconnecting the bottom wall from the cage body, said marginal wall being movably carried by said cage body, for opening and closing the space between said member and bottom wall.

7. A bird cage, comprising a cage body and base, both being circular in shape, said base having an annular marginal wall and a circular bottom wall, the latter fitting within the former and carried directly by the cage body and spaced from the lower end of the same, two sets of diametrically arranged arms extending between and connecting the bottom wall with the cage body, one of said arms having hinged connection with one of the parts between which it extends and releasable connection with the other part so that half the circumference of the space between the cage body and bottom wall may be opened for the passage of a tray, said marginal wall being movably carried by said cage body for opening and closing said space.

8. A bird cage, comprising a cage body and base, both being circular in shape, said base having an annular marginal wall and a circular bottom wall, the latter fitting within the former and carried directly by the cage body and spaced from the lower end of the same, two sets of diametrically arranged arms extending between and connecting the bottom wall with the cage body, one of said arms having hinged connection with one of the parts between which it extends and releasable connection with the other part so that half of the circumference of the space between the cage body and bottom wall may be opened for the passage of a tray, said marginal wall being slidably carried by said cage body for opening and closing said space, said marginal wall being raised above said bottom wall to open said space and lowered toward the bottom wall for closing the same.

9. A bird cage, comprising a cage body and base, both circular in shape, said cage body having a ring around its lower end, said base having an annular marginal wall and a circular bottom wall, the latter fitting within the former and spaced from said ring, two sets of diametrically spaced arms extending between and connecting the bottom wall with said ring, one of said arms having one end hinged to the bottom wall and the other end hook-shaped to releasably engage a keeper on the ring for opening half the circumference of the space between said ring and bottom wall for the passage of a tray, the other arms being carried at one end by the bottom wall and having their other ends hook-shaped to engage keepers on the ring, said marginal wall being slidably carried by said cage body for opening and closing the space between the ring and bottom wall.

In testimony that I claim the foregoing as my invention, I affix my signature, this 20th day of June 1924.

LEWICKI J. LEON.